United States Patent
Horvath et al.

(10) Patent No.: US 6,832,465 B2
(45) Date of Patent: Dec. 21, 2004

(54) AQUATIC WEEDING DEVICE

(76) Inventors: Ronald F. Horvath, 11515 - 1st St., Sturtevant, WI (US) 53177; Thad F. Elsmo, 6439 Durand Ave., Racine, WI (US) 53406; Frank M. Bilicki, 1603 S. 124th St., New Berlin, WI (US) 53151

( * ) Notice: Subject to any disclaimer, the term of this patent is extended or adjusted under 35 U.S.C. 154(b) by 0 days.

(21) Appl. No.: 10/279,318

(22) Filed: Oct. 24, 2002

(65) Prior Publication Data

US 2004/0079003 A1 Apr. 29, 2004

(51) Int. Cl.[7] .............................................. A01D 44/00
(52) U.S. Cl. ........................ 56/9; 56/16.6; 56/DIG. 2; 37/314; 37/342; 37/345
(58) Field of Search ...................... 37/314, 343, 342, 37/345, 337, 338, 307; 171/43, 62; 172/122, 123, 118; 56/8, 9, DIG. 2, 16.4 R, 16.5, 16.6, 16.4 A; 198/512, 570, 575, 586, 588, 589, 592, 602, 629, 618, 620

(56) References Cited

U.S. PATENT DOCUMENTS 3,347,029 A * 10/1967 Grinwald ......................... 56/9
4,416,106 A    11/1983 Hawk .............................. 56/8
4,696,149 A     9/1987 Hawk .............................. 56/8
5,083,417 A     1/1992 Jeronimidis et al. ............. 56/9
5,404,696 A     4/1995 Vasby ............................. 56/9
5,487,258 A     1/1996 McNabb .......................... 56/9
5,603,204 A     2/1997 Harvey-Rioux et al. ......... 56/9
6,328,165 B1 * 12/2001 Baker et al. ................. 209/235

FOREIGN PATENT DOCUMENTS

GB           2230506 A    * 10/1990

* cited by examiner

Primary Examiner—Christopher J. Novosad
(74) Attorney, Agent, or Firm—Jansson, Shupe & Munger, Ltd.

(57) ABSTRACT

An aquatic weeding device is provided for removing aquatic vegetation from a body of water and transporting the vegetation to a desired location. The weeder includes at least one weeding element connected with respect to a vessel for collecting aquatic vegetation, an extendable and retractable weed transporter positioned on the vessel for transporting the cut vegetation to a desired location, and a weed transferor positioned on the vessel for transferring the collected vegetation from the weeding element to the weed transporter.

15 Claims, 3 Drawing Sheets

AQUATIC WEEDING DEVICE

FIELD OF THE INVENTION

This invention relates generally to the removal or weeds or other vegetation from bodies of water. In particular, this invention relates to an aquatic weeding device of the type for use on a vessel and, more particularly, to such a device providing for transport of collected weeds from the vessel.

BACKGROUND OF THE INVENTION

Aquatic vegetation can grow on or below the surface of a body of water. Growths of aquatic vegetation can be a significant problem due to the rate of growth and the mass of growth over a period of time. In fact, some aquatic vegetation can completely cover a body of water in a very short period of time, making it useless for many purposes. Therefore, there is considerable incentive to remove such vegetation. In addition to the benefits of removal, after removal some types of vegetation can be used for other purposes, such as fertilizer.

In consequence, various devices have been designed for removing aquatic vegetation from the water in which it is growing. Some known devices simply cut the vegetation and leave it to sink or disperse through the body of water. Other systems include devices for gathering the vegetation on the water surface and for collecting the gathered vegetation in barges before transferring the vegetation to land. These latter systems are preferred in that they actually remove the plants from the water rather than leaving dead vegetation to rot or result in further growth.

Other aquatic weed cutting machines are known in which powered cutting implements located at the submerged, forward end of an endless conveyor elevator mounted on a barge or pontoon vessel, cut weeds below the water surface. The conveyor typically moves the severed portion of the growth away from the cutting implements. After the cutting step, these machines typically allow for the weeds to be scooped and dumped onto the shore or provide for the cut weeds to be accumulated into bales or otherwise bundled for later delivery to a desired location.

Devices which scoop the weeds from the water must continually scoop throughout the cutting process lest the weeds drift away to another part of the body of water. Typically, such scooping devices require the weeding operator to move the vessel toward the shoreline to allow the scoop to dump the weeds on land.

The devices using later delivery of the weeds to the shore typically requires use of another vessel or vehicle which receives the weeds before transferring them to their intended destination. Other devices provide for linking bundles of weeds to a line which is pulled ashore.

These prior art devices all inefficiently deal with the transport of weeds from their precut position in the lake to their destination on land. Therefore, there is a need for an improved aquatic weeding device which allows for easy transport of cut weeds to a desired location on land. In addition, there is a need for such a device which does not impede maneuverability of the weed cutting vessel.

OBJECTS OF THE INVENTION

It is an object of this invention to provide an improved aquatic weeding device, of the type for use on a water vessel, which overcomes the problems and shortcomings of the prior art, including those referred to above.

Another object of the invention is to provide a weeding device which provides for weed removal and transport to a desired location from a single vessel.

Another object of the invention is to provide an aquatic weeding device which provides for an extendable, retractable and pivotable weed transporter to allow for transport of collected weeds from the weeding vessel to a desired location.

Another object of the invention is to provide an aquatic weeding device which allows for accumulation of weeds on the vessel before moving the vessel to a dumping position where an adjustable weed transporter can be used to deliver the weeds to a desired location.

A still further object of the invention is to provide an aquatic weeding device which includes a retractable weed transporter such that the transporter may be retracted to provide increased maneuverability of the vessel when weeds are not being transported from the vessel to the desired location.

BRIEF SUMMARY OF THE INVENTION

In accordance with the present invention, an improved aquatic weeding device is provided for removing vegetation including weeds from a body of water and transporting the vegetation to a desired location.

The aquatic weeder includes: at least one weeding element for collecting aquatic vegetation or weeds connected with respect to a vessel; a weed transporter for transporting the cut vegetation to a desired location, the transporter positioned on the vessel and being extendible and retractable; and a weed transferor positioned on the vessel for transferring the collected vegetation from the weeding element to the weed transporter.

The weeding element preferably includes a weed cutter for cutting aquatic vegetation and a collecting conveyor for collecting and moving the cut vegetation to the vessel. The weeding element is preferably controllable by a weeder operator such that the weeding element can be moved in a body of water to collect located vegetation. The weed transporter is also preferably controllable by a weeder operator such that the vegetation can be delivered to the desired location when a sufficient amount of vegetation have been transferred to the weed transporter.

The weed transferor preferably comprises at least one transfer conveyor belt upon which vegetation is received from the weeding element. Vegetation can be held on the transfer conveyor until a desired amount of vegetation is accumulated before being conveyed to the transporter, continuously conveyed to the transporter from the weeding element, or conveyed at a rate between these two examples. The weed transferor preferably comprises a first transfer conveyor which receives vegetation from the weeding element and a second transfer conveyor which receives vegetation from the first transfer conveyor and transfers the vegetation to the weed transporter.

The weed transporter preferably includes at least one transport conveyor which receives vegetation from the weed transferor. More preferably, the weed transporter includes a first transport conveyor for receiving vegetation from the weed transferor and a second transport conveyor for receiving vegetation from the first transport conveyor. The second transport conveyor is preferably movable with respect to the first transport conveyor such that the weed transporter can be extended from the vessel to deliver the vegetation to a desired location, such as on the shore of the body of water. The second transport conveyor is also preferably movable with respect to the first transport conveyor such that the second transport conveyor is substantially retracted to provide maneuverability to the vessel when the weed transporter is not transporting vegetation from the vessel to the desired location.

In another embodiment of the aquatic weeder, the weeder comprises: a weed cutter; a control for operating the weed cutter at various water depths; a weed collecting system for moving the cut vegetation away from the weed cutter; and a weed transporter for transporting the cut vegetation to a desired location. The preferred transporter has a entry and exit and is adjustable such that the exit can be placed at a desired position relative to the apparatus so that the cut vegetation is delivered to the desired location. A weed transferor may be included in the aquatic weeder to transfer vegetation from the weed collecting system to the entry of the transporter.

It is preferred that the weed cutter be operatively connected with respect to a vessel, the weed transferor be positioned on the vessel and the weed transporter be positioned on the vessel and extendable and retractable such that the exit can be extended from the vessel to the desired location or retracted toward the vessel to improve the maneuverability of the vessel when cut vegetation is not being delivered to the desired location.

In addition, the weed transporter may be pivotable such that the exit can be raised or lowered with respect to the vessel independent of any extension or retraction of the weed transporter. When pivoting is coupled with extension, the exit can be placed at a wide variety of positions relative the vessel.

In an embodiment preferred in certain situations, the vegetation is received by the weed transporter directly from the a weed collecting system without use of a weed transferor. In such an embodiment, the weed transporter is positioned immediately downstream of the weed collecting system.

The invention also includes a method of removing vegetation from a body of water comprising: cutting the vegetation, collecting the vegetation onto a vessel preferably by a collecting conveyor, transferring the vegetation onto a weed transporter having an exit and, preferably, a transport conveyor, extending the weed transporter such that the exit is positioned at a desired location, transporting the vegetation from the vessel to the exit such that the vegetation is received at the desired location and retracting the weed transporter to improve maneuverability of the vessel. It is preferred that each step of the method be controllable by a weeding operator positioned on the vessel. In certain situations, the vegetation may be collected on a transfer conveyor belt before being transferred to the weed transporter.

In a preferred method, the vessel is positioned at a desired removal location before the cutting step, the vessel is moved to a desired dumping position before the extending step, and the vessel is moved to another desired removal location to begin another weed removal process after the retracting step.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

DETAILED DESCRIPTION OF PREFERRED EMBODIMENTS

Figure 1:
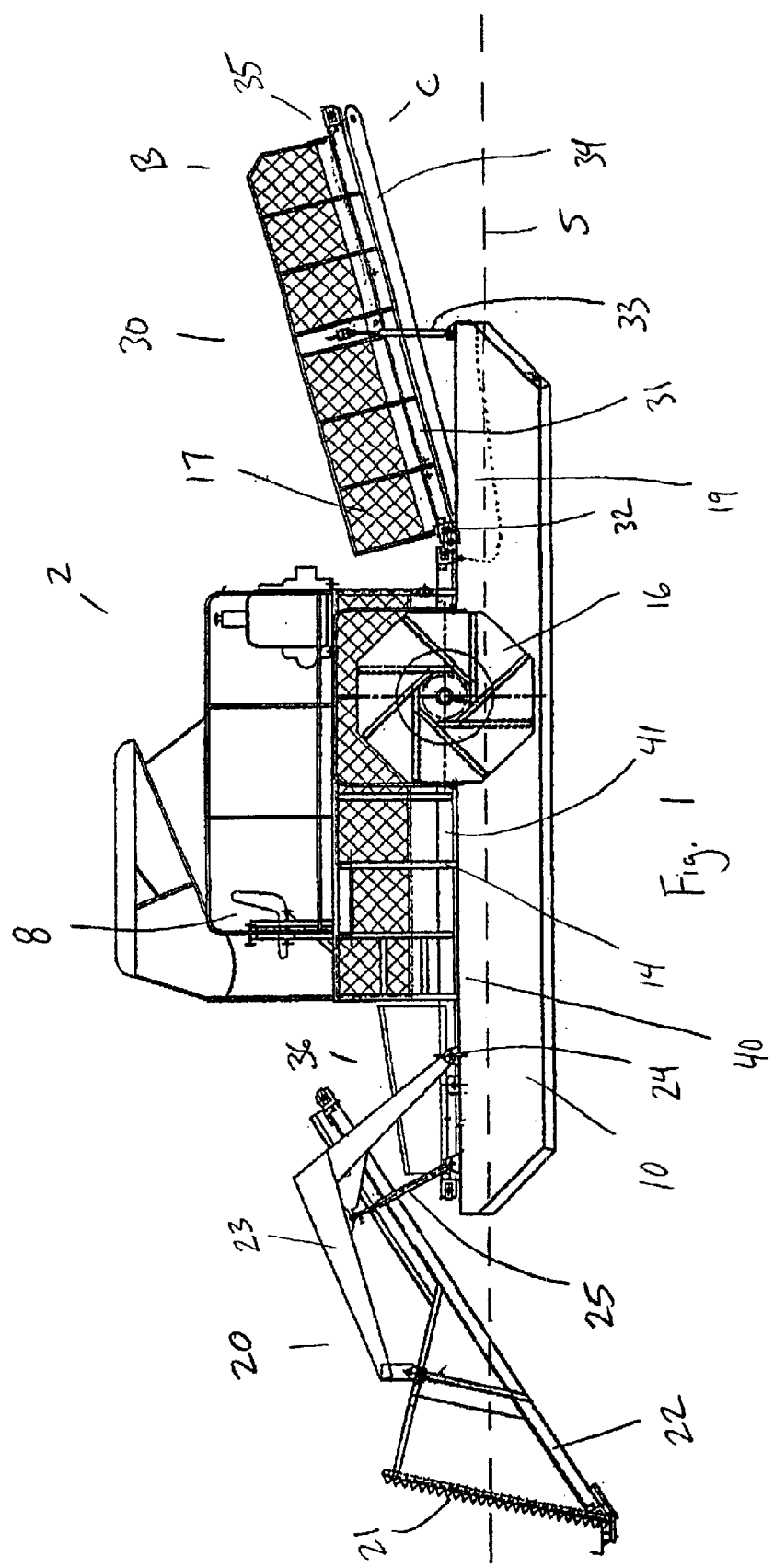
FIG. 1 is a side view of the aquatic weeding device with the weeding element submerged and the transport conveyor inclined and retracted.

FIG. 1 shows the aquatic weeder 2 submerged in water (surface of water shown as line 5). Aquatic weeder 2 comprises a vessel 10 having supports 14 for enclosures, such as fencing 17, which prevents cuttings (cut vegetation or weeds) from falling off of vessel 10. A paddle wheel 16 is positioned on each side of vessel 10 to provide for locomotion. An operator position 8 is located on top of vessel 10 in a position which allows an operator a clear view of the surroundings. Controls are used by an operator to maneuver the vessel and its components to deliver cuttings to a desired location.

Connected to the fronts end of vessel 10 is weeding element 20. Weeding element 20 is movable between a submerged position (shown below water line 5) and an upright position (shown FIG. 2). Weed cutter 21 is a blade or other type of cutting instrument which is positioned at the front of weeding element 20. Collecting conveyor 22 is adjacent weed cutter 21 and leads back to entry 36 on vessel 10. A pair of collecting arms 23 are pivotably attached to vessel 10 at arm pivots 24. Arms 23 support weed cutter 21 and collecting conveyor 22. The operator can move weeding element 20 between the submerged and upright positions by using controls to extend or retract a pair of collecting pistons 25 which are interconnected between arms 23 and vessel 11.

FIG. 1 also shows a weed transferor 40 positioned downstream of collecting conveyor 22. Weed transferor 40 includes a transfer conveyor 41 positioned on vessel 10. Transfer conveyor 41 receives cuttings from collecting conveyor 22 and can allow cuttings to accumulate, can continuously move cuttings along conveyor to the rear of vessel 10, or can be operated to allow for receipt of as much cuttings as possible. The operator can control such operation of transfer conveyor 41.

Weed transporter 30 is positioned on vessel 10 downstream of weed transferor 40 and receives cuttings therefrom. Weed transporter 30 includes a first transport conveyor 31 which is pivotably attached to vessel 10 at conveyor pivot 32. First transport conveyor 31 is movable from a level position A to an inclined position B (shown in inclined position in FIG. 1) by transport piston 33 which is interconnected between first transport conveyor 31 and vessel 10 (via support 14).

A second transport conveyor 34 is positioned below and movable downstream of first transport conveyor 31 and is pivotable along with first transport conveyor 31. Second transport conveyor is also extendible and retractable between a retracted position C and an extended position D. In this way, the exit 35 of second transport conveyor 34 can be placed at an exact position at a desired distance and angle from vessel 10.

When in the retracted position C second transport conveyor 34 is positioned at least partially within a cavity 19 (shown by a dotted line) in vessel 10. Cavity 19 is formed such that second transport conveyor 34 can be pivoted along with first transport conveyor 31 (second transport conveyor 34 may be connected with respect to first transport conveyor 31 so that transport piston 33 causes pivoting of second transport conveyor 34, or it may utilize another piston or other force). In other words, the upstream end of second transport conveyor 34 is free to move downward within cavity 19 to allow the downstream end of second transport conveyor 34 to move upward with first transport conveyor 31. A motor and device for moving second transport conveyor 34 between extended and retracted positions C,D are preferably positioned in cavity 19.

In use, the vessel 10 is moved into position on a body of water in order to cut weeds or other vegetation. Weeding element 20 is positioned so that weed cutter 21 contacts the vegetation. As vegetation is cut by weed cutter 21, the cuttings are collected and moved onto vessel 10 by collecting conveyor 22. Cuttings are received from collecting conveyor 22 by first transfer conveyor 41 which can be operated to move a full load of cuttings to first transport conveyor 31. When vessel 10 is sufficiently filled with cuttings, the operator can drive vessel 10 into an unloading position and extend and/or raise second transport conveyor 34 such that exit 35 is positioned above the desire dumping position. Then each conveyor is moved to unload cuttings from vessel 10. In certain cases, unloading may be performed during cutting such that no cuttings are accumulated on vessel 10.

In some embodiments, the weed transferor 40 can be subsumed by the weed transporter 30 such that weed transporter 30 can be considered to receive cuttings directly from collecting conveyor 22 at entry 36. In other words, first transport conveyor 31 may receive cuttings directly from collecting conveyor 22 at entry 36 or transfer conveyor 41 could be considered as a third transport conveyor. Weed transferor 40 and weed transporter 30 are delineated as separate entities for purposes of discussion.

Figure 2:
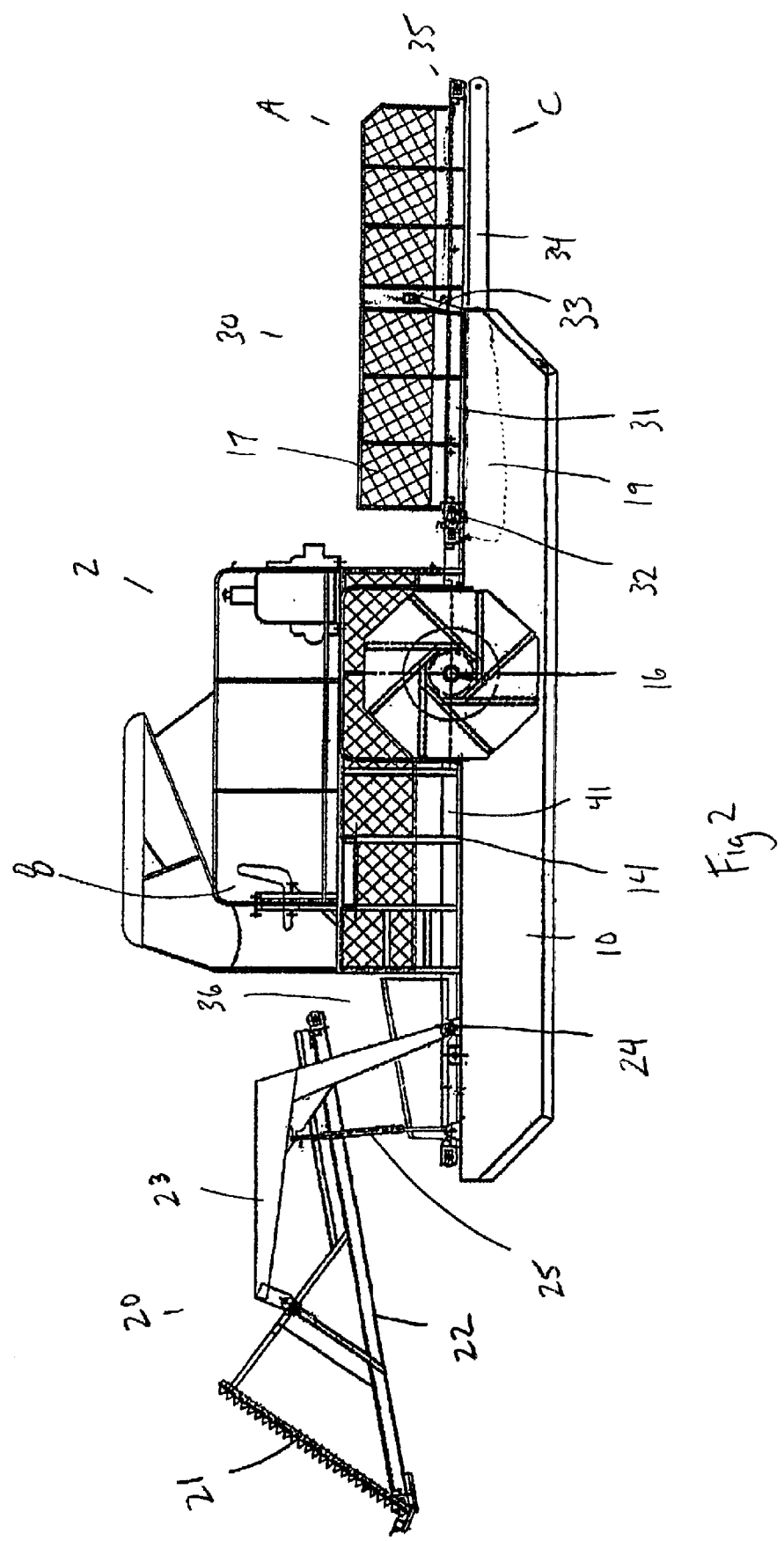
FIG. 2 is a side view of the aquatic weeding device with the weeding element raised and the transport conveyor level and retracted.

FIG. 2 shows the aquatic weeder 2 with weeding element 20 raised to its upright position and weed transporter 30 lowered to its level position A.

Figure 3:
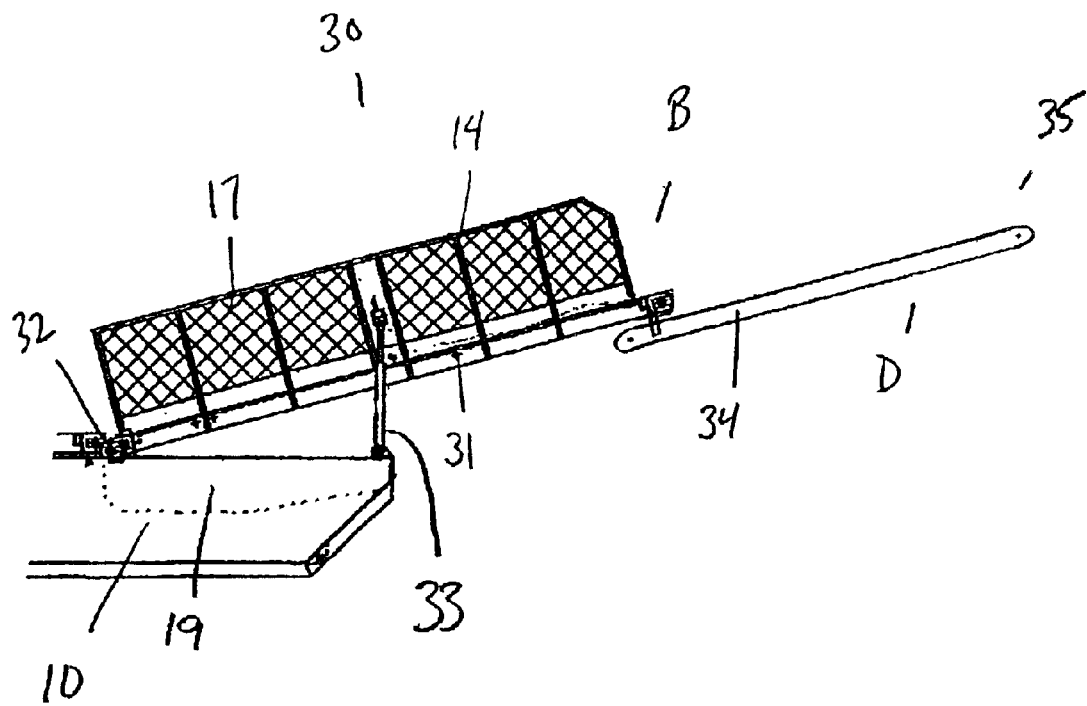
FIG. 3 is a side view of the rear portion of the vessel with the transport conveyor inclined and extended.

FIG. 3 shows the weed transporter 30 in its inclined position B with second transport conveyor in its extended position D.

Figure 4:
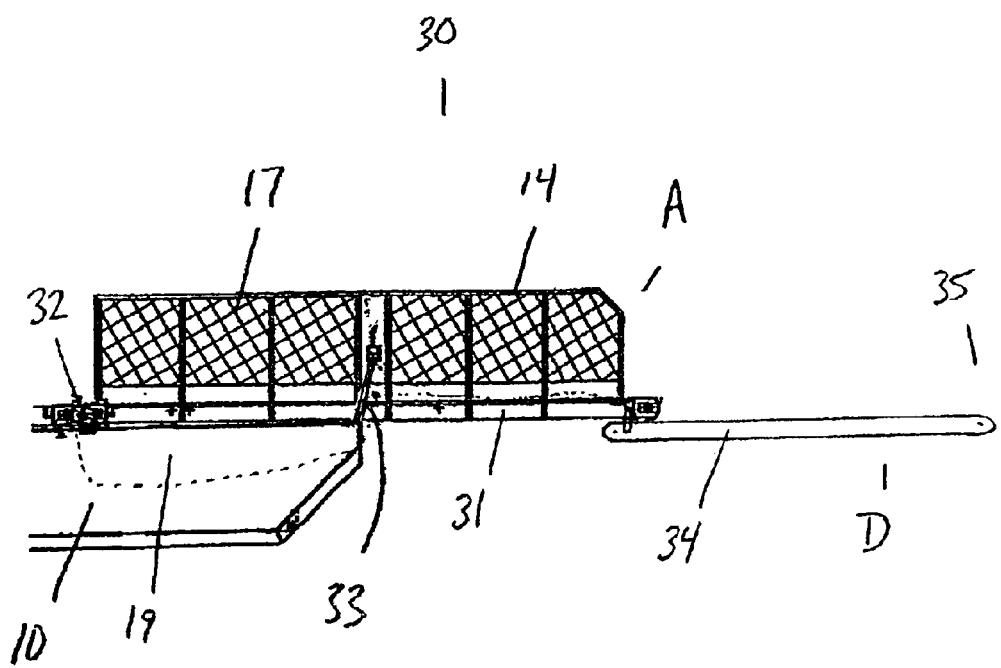
FIG. 4 is a side view of the rear portion of the vessel with the transport conveyor level and extended.

FIG. 4 shows the weed transporter 30 in its level position A with second transport conveyor in its extended position D.

Various modes of carrying out the invention are contemplated as being within the scope of the following claims particularly pointing out and distinctly claiming the subject matter as regarded as the invention.

What is claimed is:

1. An aquatic weeder positioned on a vessel, the weeder comprising:
   at least one weeding element for collecting aquatic vegetation, the at least one weeding element connected with respect to the vessel;
   a weed transporter for transporting cut vegetation to a desired location; the weed transporter positioned on the vessel and having an effective length along which the cut vegetation is transported, the weed transporter being extendible and retractable such that the effective length is increased or decreased; and
   a weed transferor for transferring the cut vegetation from the at least one weeding element to the weed transporter, the weed transferor positioned on the vessel.

2. The aquatic weeder of claim 1 wherein the at least one weeding element is controllable by a weeder operator such that the at least one weeding element can be moved in a body of water to collect located vegetation.

3. The aquatic weeder of claim 2 wherein the at least one weeding element includes a weed cutter and a collecting conveyor, the cutter for cutting aquatic vegetation and the collecting conveyor for collecting and moving the cut vegetation to the vessel.

4. The aquatic weeder of claim 1 wherein the weed transferor comprises at least one transfer conveyor belt upon which vegetation is received from the at least one weeding element.

5. The aquatic weeder of claim 4 wherein the weed transferor comprises a first transfer conveyor which receives the cut vegetation from the at least one weeding element, and a second transfer conveyor which receives the cut vegetation from the first transfer conveyor and transfers the cut vegetation to the weed transporter.

6. The aquatic weeder of claim 1 wherein the weed transporter includes at least one transport conveyor which receives the cut vegetation from the weed transferor.

7. An aquatic weeder positioned on a vessel, the weeder comprising:
   at least one weeding element for collecting aquatic vegetation, the at least one weeding element connected with respect to the vessel;
   a weed transporter for transporting cut vegetation to a desired location; the weed transporter positioned on the vessel and being extendible and retractable, the weed transporter including first and second transport conveyors, the first transport conveyor for receiving the cut vegetation from a weed transferor and the second transport conveyor for receiving the cut vegetation from the first transport conveyor, the second transport conveyor being movable with respect to the first transport conveyor such that the weed transporter can be extended from the vessel to deliver the cut vegetation to a desired location; and
   the weed transferor for transferring the cut vegetation from the at least one weeding element to the weed transporter, the weed transferor positioned on the vessel.

8. The aquatic weeder of claim 7 wherein the desired location is on land.

9. The aquatic weeder of claim 7 wherein the second transport conveyor is movable with respect to the first transport conveyor such that the second transport conveyor is substantially retracted to provide maneuverability to the vessel when the weed transporter is not transporting the cut vegetation from the vessel to the desired location.

10. The aquatic weeder of claim 7 wherein the weed transporter is controllable by a weeder operator such that the cut vegetation can be delivered to the desired location when a sufficient amount of vegetation has been transferred to the weed transporter.

11. A method of removing vegetation from a body of water comprising:
   cutting the vegetation;
   collecting the vegetation onto a vessel;
   transferring the vegetation onto a weed transporter at an entry, the weed transporter having an exit;
   extending the weed transporter such that the exit is moved away from the entry and is positioned at a desired location;
   transporting the vegetation from the vessel to the exit such that the vegetation is received at the desired location; and
   retracting the weed transporter to improve maneuverability of the vessel.

12. The method of claim 11 wherein the vegetation is collected onto the vessel by a collecting conveyor and the weed transporter includes at least one transport conveyor.

13. The method of claim 11 wherein:
the vessel is positioned at a desired removal location before the cutting step;
the vessel is moved to a desired dumping position before the extending step; and
the vessel is moved to another desired removal location to begin another weed removal process after the retracting step.

14. The method of claim 11 wherein each step is controlled by a weeding operator positioned on the vessel.

15. The method of claim 11 wherein the vegetation is collected on a being transferred to the weed transporter.

* * * * *